(12) United States Patent
Itakura et al.

(10) Patent No.: US 11,315,550 B2
(45) Date of Patent: Apr. 26, 2022

(54) SPEAKER RECOGNITION DEVICE, SPEAKER RECOGNITION METHOD, AND RECORDING MEDIUM

(71) Applicant: Panasonic Intellectual Property Corporation of America, Torrance, CA (US)

(72) Inventors: Kousuke Itakura, Osaka (JP); Ko Mizuno, Osaka (JP); Misaki Doi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 52 days.

(21) Appl. No.: 16/682,661

(22) Filed: Nov. 13, 2019

(65) Prior Publication Data

US 2020/0160846 A1 May 21, 2020

Related U.S. Application Data

(60) Provisional application No. 62/769,291, filed on Nov. 19, 2018.

(30) Foreign Application Priority Data

Jul. 19, 2019 (JP) .............................. JP2019-133958

(51) Int. Cl.
*G10L 15/14* (2006.01)
*G06F 17/18* (2006.01)
(Continued)

(52) U.S. Cl.
CPC .............. *G10L 15/14* (2013.01); *G06F 17/18* (2013.01); *G10L 25/30* (2013.01); *G10L 25/51* (2013.01)

(58) Field of Classification Search
CPC .......... G10L 15/14; G10L 25/30; G10L 25/51
(Continued)

(56) References Cited

U.S. PATENT DOCUMENTS

| 2015/0149165 A1* | 5/2015 | Saon ..................... G10L 15/063 |
| | | 704/232 |
| 2018/0061397 A1* | 3/2018 | Huang .................. G10L 15/063 |

FOREIGN PATENT DOCUMENTS

CN          108447490 A  *  8/2018 ............. G06N 5/046

OTHER PUBLICATIONS

Y. You, Y. Qian, T. He and K. Yu, "An investigation on DNN-derived bottleneck features for GMM-HMM based robust speech recognition," 2015 IEEE China Summit and International Conference on Signal and Information Processing (ChinaSIP), Chengdu, China, 2015, pp. 30-34, doi: 10.1109/ChinaSIP.2015.7230356. (Year: 2015).*

(Continued)

*Primary Examiner* — Bharatkumar S Shah

(57) ABSTRACT

A speaker recognition device according to the present disclosure includes: an acoustic feature calculator that calculates, from utterance data indicating a voice of an obtained utterance, acoustic feature of the voice of the utterance; a statistic calculator that calculates an utterance data statistic from the calculated acoustic feature; a speaker feature extractor that extracts speaker feature of a speaker of the utterance data from the calculated utterance data statistic using a deep neural network (DNN); a similarity calculator that calculates a similarity between the extracted speaker feature and pre-stored speaker feature of at least one registered speaker; and a speaker recognizer that recognizes the speaker of the utterance data based on the calculated similarity.

6 Claims, 12 Drawing Sheets

(51) Int. Cl.
*G10L 25/51* (2013.01)
*G10L 25/30* (2013.01)

(58) Field of Classification Search
USPC .......................................................... 704/231
See application file for complete search history.

(56) References Cited

OTHER PUBLICATIONS

S. Sarkar and K. S. Rao, "Significance of utterance partitioning in GMM-SVM based speaker verification in varying background environment," 2013 International Conference Oriental COCOSDA held jointly with 2013 Conference on Asian Spoken Language Research and Evaluation (O-COCOSDA/CASLRE), 2013, pp. 1-5 (Year: 2013).*

Y. You, Y. Qian, T. He and K. Yu, "An investigation on DNN-derived bottleneck features for GMM-HMM based robust speech recognition," 2015 IEEE China Summit and International Conference on Signal and Information Processing (ChinaSIP), Chengdu, China, 2015, pp. 30-34, doi: 10.1109/ChinaSIP.2015 (Year: 2015).*

E. Variani et al., "Deep Neural Networks for Small Footprint Text-Dependent Speaker Verification", In: Proc. ICASSP, 2014.

F. Richardson et al., "Deep Neural Network Approaches to Speaker and Language Recognition", In: IEEE SPL 22.10, 2015, pp. 1671-1675.

A. O. Hatch et al., "Within-Class Covariance Normalization for SVM-based Speaker Recognition", In: Proc. ICSLP, 2006.

M. McLaren et al., "Exploring the Role of Phonetic Bottleneck Features for Speaker and Language Recogniiion", In: Proc. ICASSP, 2016, pp. 5575-5579.

N. Dehak et al., "Front-End Factor Analysis for Speaker Verification", In: IEEE TASLP 19.4, May 2011, pp. 788-798.

O. Novotný et al., "On the use of X-vectors for Robust Speaker Recognition", In: Proc. Speaker Odyssey, 2018, pp. 168-175.

X. Lu et al., "A Pseudo-task Design in Multi-task Learning Deep Neural Network for Speaker Recognition", In: Proc. ISCSLP, 2016, pp. 1-5.

* cited by examiner

FIG. 10

| USED DATABASE | APP-BLA |
|---|---|
| NUMBER OF SPEAKERS FOR TRAINING | 3285 |
| NUMBER OF UTTERANCES PER PERSON | ABOUT 20 TO 50 UTTERANCES |
| TIME PERIOD PER UTTERANCE | ABOUT 2 TO 3 SECONDS |

FIG. 11

| USED DATABASE | NTT-AT JAPANESE VOICE DATABASE |
|---|---|
| NUMBER OF REGISTERED SPEAKERS | 203 |
| REGISTERED UTTERANCE TIME PERIOD | ABOUT 1 MINUTE (ABOUT 2 TO 3 SECONDS × 20 UTTERANCES) |
| UTTERANCE TIME PERIOD FOR RECOGNITION | ABOUT 1 MINUTE (ABOUT 2 TO 3 SECONDS × 20 UTTERANCES) × 3 SETS |

FIG. 12

|        | d-vector | s-vector |
|--------|----------|----------|
| CLEAR  | 87.2     | 100      |
| SN12dB | 41.4     | 93.6     |
| SN6dB  | 22.8     | 79.8     |

FIG. 13

|        | d-vector | s-vector | VARIATION OF EMBODIMENT 1 |
|--------|----------|----------|---------------------------|
| CLEAR  | 87.2     | 100      | 100                       |
| SN12dB | 41.4     | 93.6     | 98.5                      |
| SN6dB  | 22.8     | 79.8     | 95.4                      |

SPEAKER RECOGNITION DEVICE, SPEAKER RECOGNITION METHOD, AND RECORDING MEDIUM

CROSS REFERENCE TO RELATED APPLICATIONS

This application claims the benefit of priority of U.S. Provisional Patent Application No. 62/769,291 filed on Nov. 19, 2018 and Japanese Patent Application Number 2019-133958 filed on Jul. 19, 2019, the entire contents of which are hereby incorporated by reference.

BACKGROUND

1. Technical Field

The present disclosure relates to a speaker recognition device, a speaker recognition method, and a recording medium, and particularly relates to a speaker recognition device, a speaker recognition method, and a recording medium which use a deep neural network (DNN).

2. Description of the Related Art

Speaker recognition technology is technology that collects voices of utterances in advance from speakers to be registered and infers, from the similarity between feature calculated from the collected voices and feature calculated from a voice of a newly obtained utterance of an unspecified speaker, which one of the registered speakers has made the utterance of the unspecified speaker.

In recent years, research into the speaker recognition technology using deep learning has been actively conducted. For example, many speaker recognition methods using the DNN have been reported in response to rapid development of DNN-based techniques in various fields such as image processing and speech recognition.

The most simple speaker recognition method using the DNN uses acoustic feature such as mel-frequency cepstrum coefficients (MFCC) as an input, and provides an output from the final layer of the DNN as a speaker recognition result.

In this method, however, it is known that overtraining easily occurs with respect to the utterance content and the recording environment.

In view of this, a method without using the output from the final layer of the DNN has been proposed to prevent the overtraining (for example, see E. Variani et al. "Deep neural networks for small footprint text-dependent speaker verification." In: Proc. ICASSP. 2014, pp. 4052-4056 (NPL 1)). NPL 1 proposes a method for performing speaker recognition using a discriminator such as a cosine distance discriminator or probabilistic linear discriminant analysis (PLDA) by extracting an output from an intermediate layer of the DNN and providing the extracted output as feature for the speaker recognition to prevent the overtraining.

Furthermore, a method without using the DNN that provides the final output as the speaker recognition result has been proposed since the acoustic feature inherently and significantly depends on the utterance content as well as the speaker feature (for example, see F. Richardson et al. "Deep Neural Network Approaches to Speaker and Language Recognition". In: IEEE SPL 22.10 (2015), pp. 1671-1675 (NPL 2)). NPL 2 proposes a method for extracting the feature for the speaker recognition using the DNN that provides the final output as a speech recognition result.

With these methods, the feature considering a difference in the utterance content can be extracted by using the DNN to extract the feature for the speaker recognition. Accordingly, it is possible to achieve a speaker recognition method that is robust to a difference in the utterance content.

SUMMARY

However, although the speaker recognition methods using the DNN disclosed in the above NPL 1 and NPL 2 improve the accuracy for a short utterance of about 5 to 10 seconds, these methods are insufficient to improve the accuracy for a long utterance of 1 minute or more.

The present disclosure is conceived in view of such a problem, and has an object to provide a speaker recognition device, a speaker recognition method, and a recording medium which can improve the accuracy of the speaker recognition using the DNN.

A speaker recognition device according to an aspect of the present disclosure includes: an acoustic feature calculator that calculates, from utterance data indicating a voice of an utterance obtained, acoustic feature of the voice of the utterance; a statistic calculator that calculates an utterance data statistic from the acoustic feature; a speaker feature extractor that extracts speaker feature of a speaker of the utterance data from the utterance data statistic using a deep neural network (DNN); a similarity calculator that calculates a similarity between the speaker feature and pre-stored speaker feature of at least one registered speaker; and a speaker recognizer that recognizes the speaker of the utterance data based on the similarity.

It should be noted that these general and specific aspects may be implemented using a system, a method, an integrated circuit, a computer program, a computer-readable recording medium such as a CD-ROM, or any combination of systems, methods, integrated circuits, computer programs, or computer-readable recording media.

The speaker recognition device and others according to the present disclosure can improve the accuracy of the speaker recognition using the DNN.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a table illustrating an example of a training data set used in training according to an example;

FIG. 11 is a table illustrating an example of an evaluation data set used in an evaluation experiment according to the example;

FIG. 12 is a table illustrating experimental results of recognition performance evaluation using the evaluation data set according to the example;

FIG. 13 is a table illustrating experimental results of recognition performance evaluation using the evaluation data set shown in FIG. 11.

DETAILED DESCRIPTION OF THE EMBODIMENT

Figure 1:
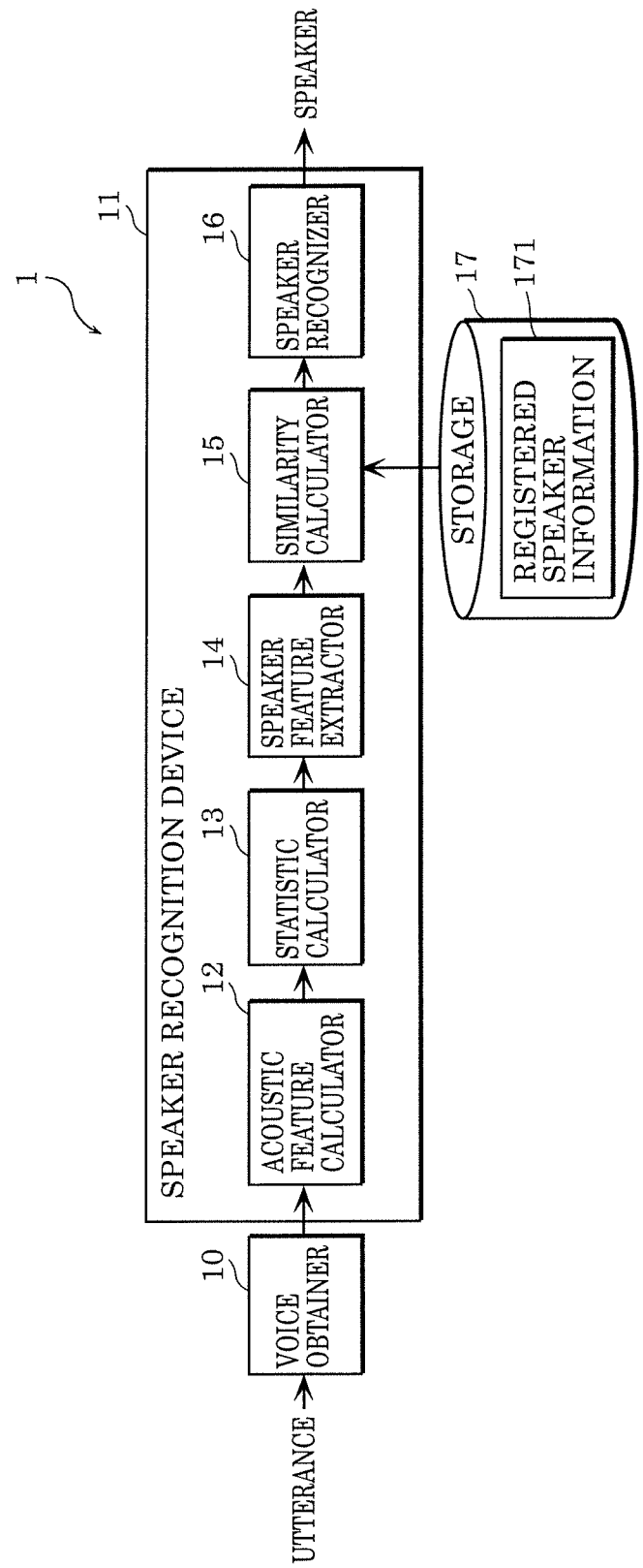
FIG. 1 is a block diagram illustrating an example of the configuration of a speaker recognition system according to an embodiment.

Circumstances Leading to an Aspect of the Present Disclosure

Conventionally, the speaker recognition technology using speaker-specific feature referred to as i-vector has been broadly researched.

Here, i-vector is calculated based on statistical feature of an utterance using a Gaussian mixture model. It should be noted that the Gaussian mixture model is represented by linear superposition of multiple Gaussian distributions, and is known as a method for performing clustering using multiple Gaussian distributions (normal distributions). More specifically, firstly, a universal background model (UBM) representing an average voice model for many unspecified speakers, i.e. a standard voice-like model, is trained in advance using voice data of many unspecified speakers. Next, a Gaussian mixture model (GMM), which is a model for a speaker to be recognized, is inferred by adapting the UBM to the speaker to be recognized. Subsequently, a GMM super vector obtained by concatenating the predetermined number of mean vectors of the GMM is calculated as the speaker-specific feature, i.e. i-vector. Here, the predetermined number is the number of the mixed Gaussian distributions. For example, a piece of utterance data of the speaker to be recognized is used to concatenate the mean vectors of the GMM obtained by adapting the UBM, and thereby it is possible to calculate the GMM super vector, i.e. i-vector, for the piece of utterance data. Furthermore, the speaker recognition method using i-vector is easier to obtain an accurate statistic for a longer utterance. Accordingly, the accuracy of the speaker recognition is high for a long utterance.

On the other hand, as described above, research into the speaker recognition technology using deep learning has been actively conducted in recent years, and many speaker recognition methods using the DNN have been reported in response to rapid development of DNN-based techniques in various fields such as image processing and speech recognition.

For example, as described above, NPL 1 proposes a method for performing speaker recognition using a discriminator such as a cosine distance discriminator or a PLDA by extracting output from an intermediate layer of the DNN and providing the extracted output as feature for the speaker recognition. Furthermore, for example, as described above, NPL 2 proposes a method for extracting the feature for the speaker recognition using the DNN that provides the final output result as a speech recognition result. With these methods, the feature considering a difference in the utterance content can be extracted by using the DNN to extract the feature for the speaker recognition. Accordingly, it is possible to achieve a speaker recognition method that is robust to a difference in the utterance content.

Furthermore, the speaker recognition methods using the DNN disclosed in NPL 1 and NPL 2 achieve a performance higher than that of the speaker recognition method using i-vector.

However, the recognition performance, i.e. the accuracy, for each of utterance lengths has been evaluated as follows. For a short utterance of about 5 to 10 seconds, the speaker recognition methods using the DNN disclosed in NPL 1 and NPL 2 achieve a performance higher than that of the speaker recognition method using i-vector, whereas for a long utterance of 1 minute or more, it has been reported that these methods have a performance lower than that of the speaker recognition method using i-vector.

After a considerable study of this, the inventors found the following reason why the speaker recognition method using the DNN does not sufficiently improve the accuracy for a long utterance of 1 minute or more. In other words, the speaker recognition method using the DNN independently repeats speaker recognition using short-time acoustic feature, and performs speaker recognition over the entire utterance by taking the average, etc. In general, for a longer utterance, more abundant information is included in the entire utterance. However, the speaker recognition method using the DNN performs a simple process of averaging for each short time, and thus the abundant information in a long utterance is lost. Accordingly, the accuracy of the speaker recognition could not be sufficiently improved for the long utterance.

In other words, the inventors found that one of the reasons why the speaker recognition method using the DNN does not sufficiently improve the accuracy of the speaker recognition for a long utterance is to take into account no characteristics of the entire utterance due to the acoustic feature for each time (short time) independently used as an input.

It should be noted that if the input dimension of utterance data provided to the DNN increases, the feature over the entire utterance is available at once. However, this makes it extremely difficult to train the DNN using the high-dimensional utterance data as reference data, and such training is not practical.

Accordingly, after a considerable study of this, the inventors found that instead of directly using acoustic feature calculated from the utterance data as an input of the DNN for extracting speaker feature, statistical processing for the acoustic feature is newly introduced before the DNN.

OUTLINE OF THE PRESENT DISCLOSURE

The outline of an aspect of the present disclosure is as follows.

A speaker recognition device according to an aspect of the present disclosure includes: an acoustic feature calculator that calculates, from utterance data indicating a voice of an utterance obtained, acoustic feature of the voice of the utterance; a statistic calculator that calculates an utterance data statistic from the acoustic feature; a speaker feature extractor that extracts speaker feature of a speaker of the utterance data from the utterance data statistic using a deep neural network (DNN); a similarity calculator that calculates a similarity between the speaker feature and pre-stored speaker feature of at least one registered speaker; and a speaker recognizer that recognizes the speaker of the utterance data based on the similarity.

With this, the accuracy of the speaker recognition can be improved even for a long utterance by extracting the speaker feature through the DNN using the utterance data statistic corresponding to the acoustic feature including information on the entire utterance. Accordingly, it is possible to improve the accuracy of the speaker recognition using the DNN.

Furthermore, for example, the utterance data statistic may be a statistic over an entire utterance that is obtained by performing statistical processing for extracting characteristics of the entire utterance from the acoustic feature, the entire utterance including the utterance.

With this, it is possible to calculate the statistic that allows the extraction of the speaker feature considering the characteristics over the entire utterance, and thus the accuracy of the speaker recognition can be improved even for a long utterance.

Furthermore, for example, the statistic calculator may extract the utterance data statistic by classifying components of the acoustic feature into classes and calculating a mean for each of the classes to obtain the utterance data statistic.

With this, it is possible to calculate the statistic that allows the extraction of the speaker feature considering the characteristics over the entire utterance, and thus the accuracy of the speaker recognition can be improved even for a long utterance.

Furthermore, for example, the statistic calculator may infer a Gaussian mixture model (GMM) from an universal background model (UBM), and calculate, as the utterance data statistic, a difference between a super vector obtained by concatenating mean vectors of respective Gaussian distributions of the GMM and a super vector obtained by concatenating mean vectors of respective Gaussian distributions of the UBM, the GMM being a speaker model for the utterance data and formed by mixing the Gaussian distributions each corresponding to a different one of classes into which components of the acoustic feature of the voice of the utterance are classified, the UBM being an initial model and formed by mixing the Gaussian distributions each corresponding to a different one of classes into which components of acoustic feature of voices of utterances of many unspecified speakers are classified.

With this, it is possible to calculate the statistic that allows the extraction of the speaker feature considering the characteristics over the entire utterance, based on the difference between the acoustic feature of the utterances of general speakers and the acoustic feature of the utterance of a speaker to be recognized, and thus the accuracy of the speaker recognition can be improved even for a long utterance.

Furthermore, for example, the DNN includes an input layer, a plurality of intermediate layers, and an output layer, and the speaker feature extractor may extract the speaker feature from any one of the plurality of intermediate layers of the DNN.

With this, the speaker feature can be extracted through the DNN without dependence on the speakers of the utterance data used to train the DNN. Accordingly, it is possible to improve the accuracy of the speaker recognition using the DNN.

Furthermore, for example, the DNN is a bottleneck DNN, and a total number of nodes in one of the plurality of intermediate layers is less than a total number of nodes in a remainder of the plurality of intermediate layers.

With this, the dimension of the speaker feature extracted through the DNN can be reduced without losing information necessary for the speaker recognition.

A speaker recognition method according to an aspect of the present disclosure, executed by a computer includes: calculating, from utterance data indicating a voice of an utterance obtained, acoustic feature of the voice of the utterance; calculating an utterance data statistic from the acoustic feature; extracting speaker feature of a speaker of the utterance data from the utterance data statistic using a deep neural network (DNN); calculating a similarity between the speaker feature and pre-stored speaker feature of at least one registered speaker; and recognizing the speaker of the utterance data based on the similarity.

A recording medium according to an aspect of the present disclosure, on which a computer program is recorded, the computer program causing a computer to execute: calculating, from utterance data indicating a voice of an utterance obtained, acoustic feature of the voice of the utterance; calculating an utterance data statistic from the acoustic feature; extracting speaker feature of a speaker of the utterance data from the utterance data statistic using a deep neural network (DNN); calculating a similarity between the speaker feature and pre-stored speaker feature of at least one registered speaker; and recognizing the speaker of the utterance data based on the similarity.

It should be noted that these general and specific aspects may be implemented using a system, a method, an integrated circuit, a computer program, a computer-readable recording medium such as a CD-ROM, or any combination of systems, methods, integrated circuits, computer programs, or computer-readable recording media.

The following describes an embodiment according to the present disclosure with reference to the drawings. It should be noted that the following embodiment shows a comprehensive or specific illustration of the present disclosure. The numerical values, shapes, structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts of the present disclosure will be described as optional structural components. It should be also noted that the descriptions in the following embodiment, variation, etc. may be combined.

EMBODIMENT

Hereinafter, a speaker recognition method and others using DNN according to an embodiment will be described with reference to the drawings.

[Speaker Recognition System 1]

FIG. 1 is a block diagram illustrating an example of the configuration of speaker recognition system 1 according to this embodiment.

Speaker recognition system 1 according to this embodiment is used to recognize a speaker from among the registered speakers.

As shown in FIG. 1, speaker recognition system 1 includes voice obtainer 10, speaker recognition device 11, and storage 17.

[Voice Obtainer 10]

Voice obtainer 10 includes, for example, a micro phone, and obtains a voice of an utterance of a speaker. Voice obtainer 10 converts the obtained voice to a voice signal, and provides the voice signal to acoustic feature calculator 12.

[Speaker Recognition Device 11]

Speaker recognition device 11 is implemented by a computer including, for example, a processor (a microprocessor), a memory, and a communication interface. Speaker recognition device 11 may be included in a server to operate, or a part of speaker recognition device 11 may be included in a cloud server to operate. Speaker recognition device 11 performs a process for recognizing which one of the registered speakers has made a target utterance.

As shown in FIG. 1, speaker recognition device 11 includes acoustic feature calculator 12, statistic calculator 13, speaker feature extractor 14, similarity calculator 15, and speaker recognizer 16. It should be noted that speaker recognition device 11 may further include storage 17, but this configuration is not necessary.

[Acoustic Feature Calculator 12]

Acoustic feature calculator 12 calculates, from utterance data indicating a voice of an utterance obtained, acoustic feature of the voice of the utterance. In this embodiment, acoustic feature calculator 12 calculates, as the acoustic feature, MFCC which is feature of the voice of the utterance, from the voice signal provided from voice obtainer 10. MCFF is feature representing vocal tract characteristics of a speaker, and is also broadly used in speech recognition. More specifically, MFCC is acoustic feature obtained by analyzing a voice frequency spectrum based on human aural characteristics. It should be noted that acoustic feature calculator 12 is not limited to the case in which MFCC is calculated as the acoustic feature of an utterance. A resultant obtained by applying a Mel-filter bank to the voice signal of an utterance, or a spectrogram of the voice signal of an utterance may be calculated as the acoustic feature. Furthermore, acoustic feature calculator 12 may use a deep-learning neural network such as DNN to calculate the acoustic feature indicating voice feature from the voice signal of an utterance.

[Statistic Calculator 13]

Statistic calculator 13 is disposed before speaker feature extractor 14, performs statistical processing on the acoustic feature calculated by acoustic feature calculator 12, and provides the resultant statistic associated with speaker feature to speaker feature extractor 14. More specifically, statistic calculator 13 calculates an utterance data statistic from the acoustic feature calculated by acoustic feature calculator 12.

Here, the mean and variance may be used as statistical processing to calculate the statistic. In other words, the temporal mean and variance may be used to calculate the statistic from MFCC calculated as the acoustic feature for each utterance. With this, the statistic for each utterance can be calculated for each of the speakers.

Furthermore, the statistic may be an utterance data statistic corresponding to acoustic feature including information on an entire utterance. More specifically, the statistic may be a statistic over an entire utterance that is obtained by performing statistical processing for extracting characteristics of the entire utterance including the utterance, from the acoustic feature. Such a statistic over the entire utterance that includes characteristics of the entire utterance is calculated by modeling an utterance using the Gaussian mixture model.

The statistic according to this embodiment will be described below as the utterance data statistic over the entire utterance.

Figure 2:
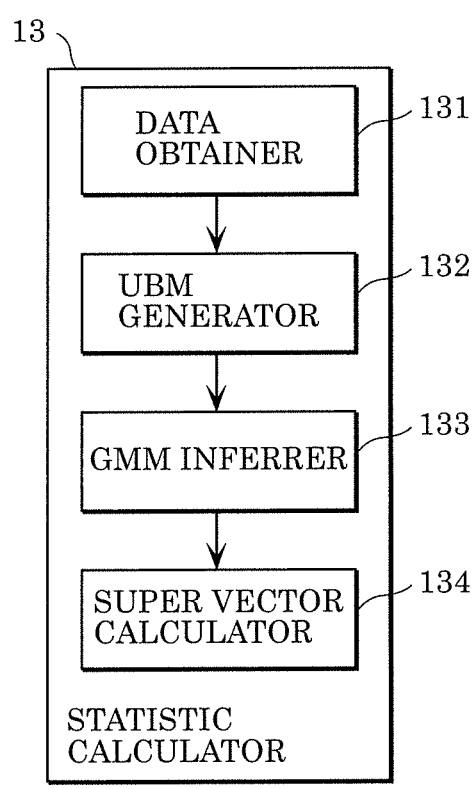
FIG. 2 is a block diagram illustrating an example of the specific configuration of a statistic calculator according to the embodiment.
Figure 3:
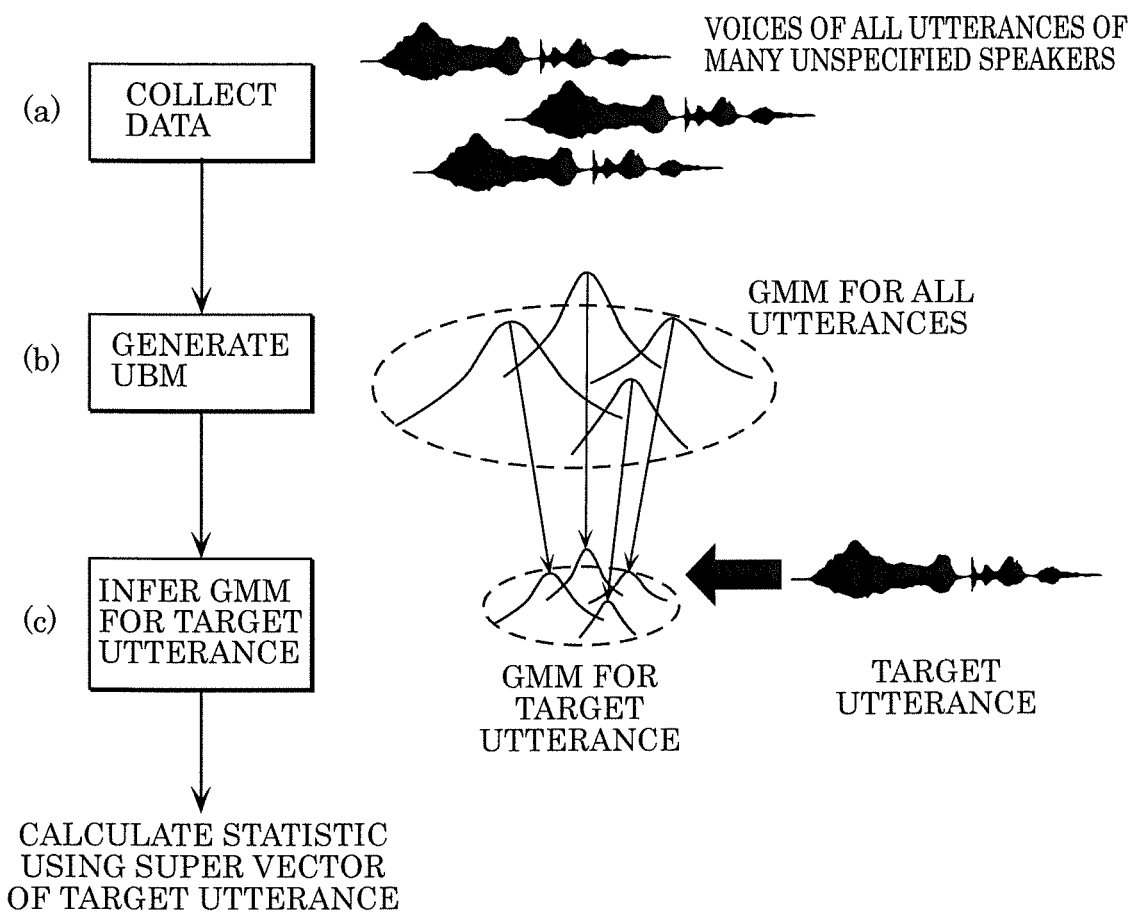
FIG. 3 is a conceptual diagram illustrating a statistic calculation procedure in the statistic calculator according to the embodiment.

FIG. 2 is a block diagram illustrating an example of the specific configuration of statistic calculator 13 according to this embodiment. FIG. 3 is a conceptual diagram illustrating a statistic calculation procedure in statistic calculator 13 according to this embodiment.

As shown in FIG. 2, statistic calculator 13 according to this embodiment includes data obtainer 131, UBM generator 132, GMM inferrer 133, and super vector calculator 134. Statistic calculator 13 classifies components of the acoustic feature calculated by acoustic feature calculator 12 into classes and calculates the mean for each of the classes to obtain the utterance data statistic.

<Data Obtainer 131>

Data obtainer 131 obtains acoustic feature of voices of utterances of many unspecified speakers. As shown in, for example, (a) of FIG. 3, data obtainer 131 according to this embodiment collects, as the acoustic feature, MFCC data of the pre-provided voices of all utterances of many unspecified speakers. Data obtainer 131 may obtain data by calculating, as the acoustic feature, the MFCC from the voice signal of all utterances of many unspecified speakers provided from voice obtainer 10. In this case, data obtainer 131 obtains the acoustic feature of voices of utterances of many unspecified speakers by calculating the MFCC for each of the time frames for the voices of all utterances of many unspecified speakers.

<UBM Generator 132>

UBM generator 132 generates a UBM which is an initial model formed by mixing the Gaussian distributions each corresponding to a different one of classes into which components of acoustic feature of voices of utterances of many unspecified speakers are classified.

It should be noted that the UBM described here is generated in the same manner as a UBM used to extract i-vector.

More specifically, firstly, UBM generator 132 calculates a time derivative (ΔMFCC) of the MFCC and a time derivative (ΔΔMFCC) of the time derivative (ΔMFCC) of the MFCC. The MFCC is over all the time frames for the voices of all utterances obtained by data obtainer 131. Next, by assuming that the values of MFCC, ΔMFCC, and ΔΔMFCC are generated from a common Gaussian mixture model (GMM) as shown in Equation 1, UBM generator 132 infers the Gaussian mixture model (GMM).

[Math. 1]

$$p(X_{nt}) = \sum_i \pi_i N(X_{nt} | m_i, \sum_i) \quad \text{(Equation 1)}$$

where $X_{nt}$ is a vector obtained by concatenating the values of MFCC, ΔMFCC, and ΔΔMFCC for utterance n and time t. When only the MFCC for utterance n and time t is used, data preceding and following the utterance is unclear. However, it becomes possible to include data preceding and following the MFCC for utterance n and time t by further using values of single and double derivatives of the MFCC. Furthermore, $\pi_i$, $m_i$, and $\Sigma_i$ are the mixture ratio, mean, and covariance matrix of the i-th Gaussian distribution of the GMM, respectively. It should be noted that $m_i$ and $\Sigma_i$ represent the shape of the mountain of one of the Gaussian distributions. The Gaussian mixture model (GMM) inferred for all utterances of many unspecified speakers is also referred to as UBM since the inferred GMM is an initial model representing an average voice model for many unspecified speakers, i.e. a standard voice-like model.

Accordingly, as shown in, for example, (b) of FIG. 3, UBM generator 132 generates, as the UBM, the Gaussian mixture model (GMM) inferred for all utterance of many unspecified speakers. It should be noted that in the UBM, each of the mixed Gaussian distributions corresponds to a different one of classes into which the components of the acoustic feature of the voices of many unspecified speakers are classified.

<GMM Inferrer 133>

GMM inferrer 133 infers, from the UBM that is the initial model generated by UBM generator 132, a GMM that is a speaker model for utterance data of a target utterance and formed by mixing Gaussian distributions each corresponding to a different one of classes into which the components of the acoustic feature of the voice of the target utterance are classified.

More specifically, as shown in, for example, (c) of FIG. 3, GMM inferrer 133 infers the GMM for target utterance n, as shown in Equation 2, by adapting the UBM generated by UBM generator 132 to an utterance of a speaker to be recognized, i.e. target utterance n. The GMM for target utterance n can be obtained by adapting the UBM using the maximum a posteriori probability (MAP) estimation.

[Math. 2]

$$p(X_{nt}) = \sum_i \pi_{ni} N(X_{nt} | m_{ni}, \Sigma_{ni}) \quad \text{(Equation 2)}$$

where $X_{nt}$ is a vector obtained by concatenating the values of MFCC, ΔMFCC, and ΔΔMFCC for utterance n and time t. Furthermore, $\pi_{ni}$, $m_{ni}$, and $\Sigma_{ni}$ are the mixture ratio, mean, and covariance matrix of the i-th Gaussian distribution of the GMM, respectively. It should be noted that $m_{ni}$ and $\Sigma_{ni}$ represent the shape of the mountain of one of the Gaussian distributions.

In this manner, GMM inferrer 133 can obtain, from the UBM generated by UBM generator 132, using the maximum a posteriori probability training (estimation), the GMM for utterance n that constitutes a model for the voice of the target utterance. It should be noted that in the GMM for target utterance n, each of the mixed Gaussian distributions corresponds to a different one of classes into which the components of the acoustic feature of the voice of target utterance n are classified.

<Super Vector Calculator 134>

Super vector calculator 134 calculates, as the statistic, a difference between a super vector obtained by concatenating mean vectors of respective Gaussian distributions of the GMM for the target utterance and a super vector obtained by concatenating mean vectors of respective Gaussian distributions of the UBM More specifically, firstly, super vector calculator 134 calculates a super vector obtained by concatenating all the predetermined number of mean vectors of respective Gaussian distributions forming the GMM for target utterance n, and a super vector obtained by concatenating all the predetermined number of mean vectors of respective Gaussian distributions forming the UBM. Here, the predetermined number is the number of the mixed Gaussian distributions, and the high-dimensional vector obtained by concatenating all the mean vectors of respective Gaussian distributions forming each of UBM and GMM is referred to as the super vector.

Next, as shown in Equation 3, super vector calculator 134 calculates difference $a_n$ between the super vector of UBM and the super vector of GMM for utterance n to obtain the calculated difference $a_n$ as the statistic. In Equation 3, I denotes the number of the mixed Gaussian distributions.

Math. 3

$$a_n = [(m_{n1} - m_1)^T, \ldots, (m_{nI} - m_I)^T]^T \quad \text{(Equation 3)}$$

As described above, by using the UBM used to extract i-vector, statistic calculator 13 calculates the statistic over the entire utterance from the acoustic feature such as MFCC, based on a difference between the acoustic feature of general speakers and the acoustic feature of a target utterance of a speaker to be recognized.

[Speaker Feature Extractor 14]

Figure 4:
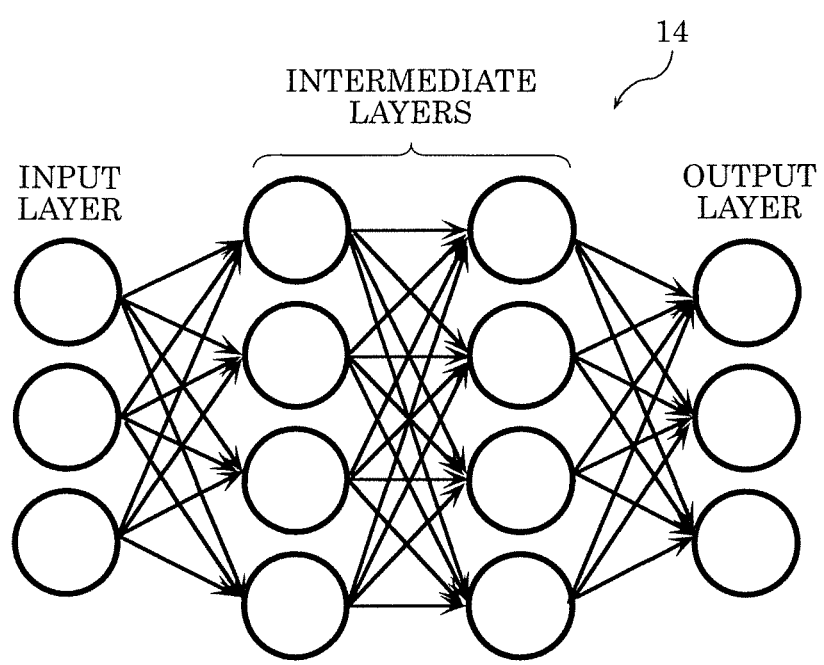
FIG. 4 is a block diagram illustrating an example of the configuration of DNN used in a speaker feature extractor according to the embodiment.
Figure 5:
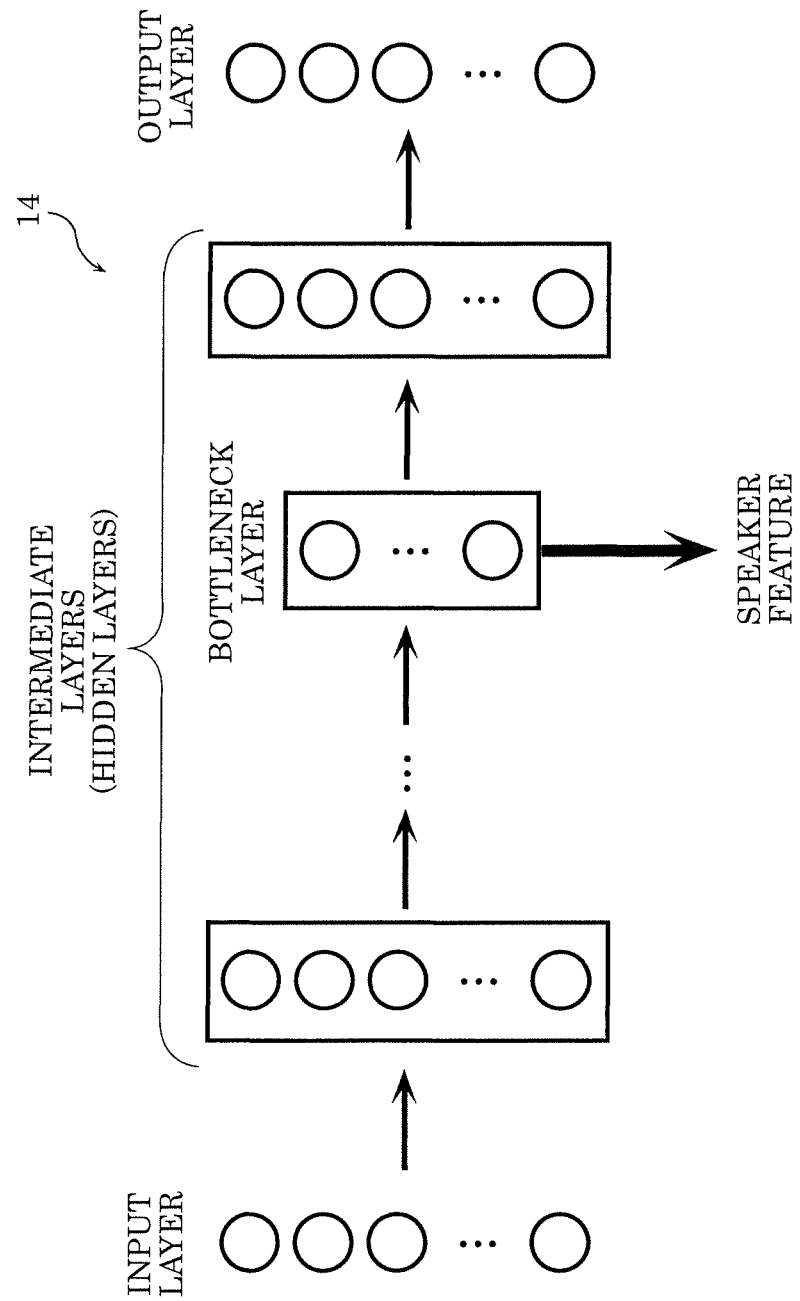
FIG. 5 is a block diagram illustrating another example of the configuration of the DNN used in the speaker feature extractor according to the embodiment.

FIG. 4 is a block diagram illustrating an example of the configuration of DNN used in speaker feature extractor 14 according to this embodiment. FIG. 5 is a block diagram illustrating an example of the configuration of DNN used in speaker feature extractor 14 according to this embodiment.

Speaker feature extractor 14 uses a DNN to extract speaker feature of a speaker of utterance data from the statistic calculated by statistic calculator 13.

Here, the DNN may be implemented by, for example, a trained feature extractor and a recognizer. In this case, speaker feature extractor 14 provides the statistic to this DNN, and thereby may cause the DNN to output the speaker feature which is feature obtained by mapping the statistic including the utterance of a speaker to be recognized to a fixed-dimensional embedding. Depending on a model preprovided as the DNN, it is possible to obtain the speaker feature in which a performance loss rarely occurs even for a short utterance.

Furthermore, as shown in, for example, FIG. 4, the DNN may be implemented as a neural network including an input layer, multiple intermediate layers, and an output layer. In this case, speaker feature extractor 14 provides the statistic to this DNN, and may extract the speaker feature from any one of the intermediate layers of the DNN.

With this, even when using the DNN that has been trained to provide the final output as a speaker recognition result, it is possible to be independent of the speakers for training, i.e. the speakers of the utterance data used to train the DNN.

Furthermore, the DNN includes an input layer, multiple intermediate layers, and an output layer, and may be implemented as a bottleneck DNN in which the number of nodes in one of the intermediate layers is less than that in a remainder of the intermediate layers. More specifically, as shown in, for example, FIG. 5, the bottleneck DNN includes multiple intermediate layers (hidden layers) only one of which has nodes the number of which is less than the number of nodes in a remainder of the intermediate layers. Hereinafter, the intermediate layer in which the number of nodes is less than that in a remainder of the intermediate layers is referred to as a bottleneck layer.

Furthermore, speaker feature extractor 14 provides the statistic to this bottleneck DNN, and may extract the speaker feature from the bottleneck layer. By extracting an output from the bottleneck layer as the speaker feature, speaker feature extractor 14 can extract the speaker feature expressed by a lower dimension, from the statistic without losing information necessary for the speaker recognition.

It should be noted that the bottleneck layer is known as being able to extract more appropriate feature for the bottleneck layer disposed in the intermediate layer closer to the output layer, and providing the best performance for the bottleneck layer disposed in the intermediate layer immediately before the final intermediate layer. In view of this, the bottleneck layer according to this embodiment is the intermediate layer immediately before the final intermediate layer.

Now, various researches on the speaker recognition using the bottleneck DNN are performed. For example, there is an approach that directly extracts information necessary for the speaker recognition by selecting the speaker recognition as a training task for the bottleneck DNN. There is also another approach that extracts the speaker feature in association with phonemes by selecting a task different from the speaker recognition, such as speech recognition or language recognition, as the training task for the bottleneck DNN.

In this embodiment, the statistic calculated by preceding statistic calculator 13 is decreased in information on phonemes by the statistical processing used to calculate the statistic. Accordingly, not the speech recognition but the speaker recognition is selected as the training task of the bottleneck DNN.

Furthermore, in the bottleneck DNN, the number of nodes in the input layer is equal to the number of dimensions of the statistic calculated by statistic calculator 13, and the number of nodes in the output layer is equal to the number of speakers in the training data used in the training. Accordingly, in the training, the bottleneck DNN receives a utterance data statistic indicating a voice of an utterance of a speaker, and is trained to output 1 to a node for a speaker matching the utterance and 0 to nodes for the other speakers in the output layer.

It should be noted that as described above, the bottleneck DNN uses the output from the bottleneck layer as the speaker feature, and thus the output layer and the final intermediate layers following the bottleneck layer are used only for the training and not used to extract the speaker feature.

In this manner, speaker feature extractor 14 inputs the statistic to the DNN that selects the speaker recognition as the training task, and extracts the output from the intermediate layer of the DNN. With this, it is possible to use the DNN to convert the statistic to the speaker feature suitable for the speaker recognition.

[Similarity Calculator 15]

Similarity calculator 15 calculates a similarity between the speaker feature extracted by speaker feature extractor 14 and pre-stored speaker feature of at least one registered speaker.

In this embodiment, a similarity between the speaker feature extracted by speaker feature extractor 14 and speaker feature of each of one or more registered speakers included in registered speaker information 171 stored on storage 17 is calculated. Here, the speaker feature of each of the one or more registered speakers is included in pre-stored registered speaker information 171.

Similarity calculator 15 may calculate the similarity, for example, by calculating a cosine using an inner product in a vector space model. More specifically, a cosine distance (also referred to as a cosine similarity) indicating an intervector angle between the speaker feature extracted by speaker feature extractor 14 and the pre-stored speaker feature of each of the one or more registered speakers may be calculated as the similarity.

Figure 6:
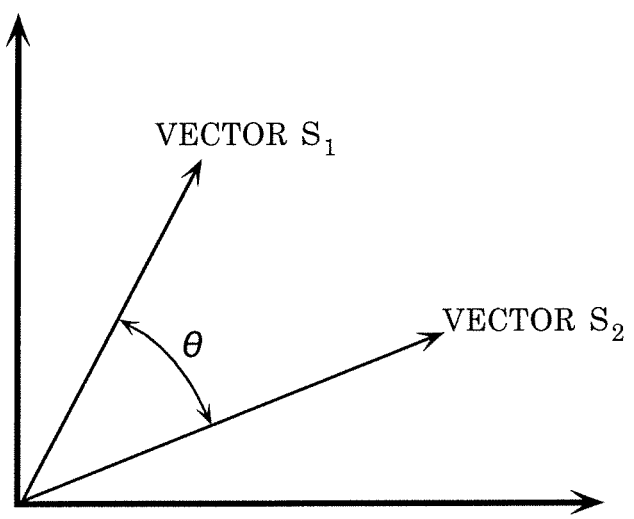
FIG. 6 is a diagram illustrating an example of a similarity calculated by a similarity calculator according to the embodiment.

FIG. 6 is a diagram illustrating an example of a similarity calculated by similarity calculator 15 according to this embodiment. More specifically, FIG. 6 shows, as the similarity calculated by similarity calculator 15, an example of the cosine distance between vector $S_1$ indicating the speaker feature extracted by speaker feature extractor 14 and vector $S_2$ indicating the speaker feature of a registered speaker. The similarity decreases with an increase in the value of the intervector angle $\theta$.

It should be noted that similarity calculator 15 may calculate, as the similarity, a cosine distance ranging from −1 to 1 using the inner product of a vector indicating the speaker feature extracted by speaker feature extractor 14 and a vector indicating the pre-stored speaker feature of each of the one or more registered speakers. In this case, the similarity increases with an increase in the value of the cosine distance.

In this embodiment, similarity calculator 15 calculates the similarity after within-class covariance normalization (WCCN) is applied to the speaker feature extracted by speaker feature extractor 14 and the pre-stored speaker feature of each of the one or more registered speakers. Here, the WCCN is a method for normalizing the variance of class data using a transformation matrix. This is because the speaker feature extracted by speaker feature extractor 14 also includes information depending on a recording environment in which voice obtainer 10 obtains a voice of an utterance of a speaker, such as channel information of a microphone. Accordingly, similarity calculator 15 calculates the cosine distance as the similarity after the WCCN is applied to transform the speaker feature extracted by speaker feature extractor 14 and the pre-stored speaker feature of each of the one or more registered speakers.

Furthermore, when storage 17 stores a trained similarity calculation model, similarity calculator 15 may use the trained similarity calculation model to calculate the similarity between the speaker feature extracted by speaker feature extractor 14 and the pre-stored speaker feature of each of the one or more registered speakers. More specifically, similarity calculator 15 may use the trained similarity calculation model stored on storage 17 to calculate the similarity from the speaker feature extracted by speaker feature extractor 14 using probabilistic linear discriminant analysis (PLDA).

Here, the trained similarity calculation model has been trained about the speaker feature of each of the one or more registered speakers including how to speak. The trained similarity calculation model can be obtained by pre-training a possible distribution of change in the feature depending on how to speak and recording conditions including the surrounding environment even for an utterance of the same speaker. With this, the trained similarity calculation model has higher performance as the recording conditions under which voice obtainer 10 obtains a voice of an utterance of a speaker are closer to recording conditions used to train the similarity calculation model.

[Speaker Recognizer 16]

Speaker recognizer 16 recognizes the speaker of the utterance data based on the similarity calculated by similarity calculator 15.

Speaker recognizer 16 according to this embodiment compares the similarities calculated by similarity calculator 15, i.e. similarities between the speaker feature of the target utterance and each of the registered speaker features, and outputs the most possible registered speaker as a recognition result.

[Storage 17]

Storage 17 is implemented as, for example, rewritable non-volatile memory such as a hard disk drive or a solid state drive, and stores the speaker feature specific to each of the one or more registered speakers. As shown in FIG. 1, storage 17 according to this embodiment stores registered speaker information 171. As described above, registered speaker information 171 includes the speaker feature of each of the one or more registered speakers. The speaker feature of each of the one or more registered speakers is obtained by non-linearly transforming the statistic over the entire utterance calculated from the acoustic feature of the pre-collected voices of the utterances of the one or more registered speakers, using the DNN used in speaker feature extractor 14.

[Operation of Speaker Recognition Device 11]

Next, the operation of speaker recognition device 11 configured as described above will be described.

Figure 7:
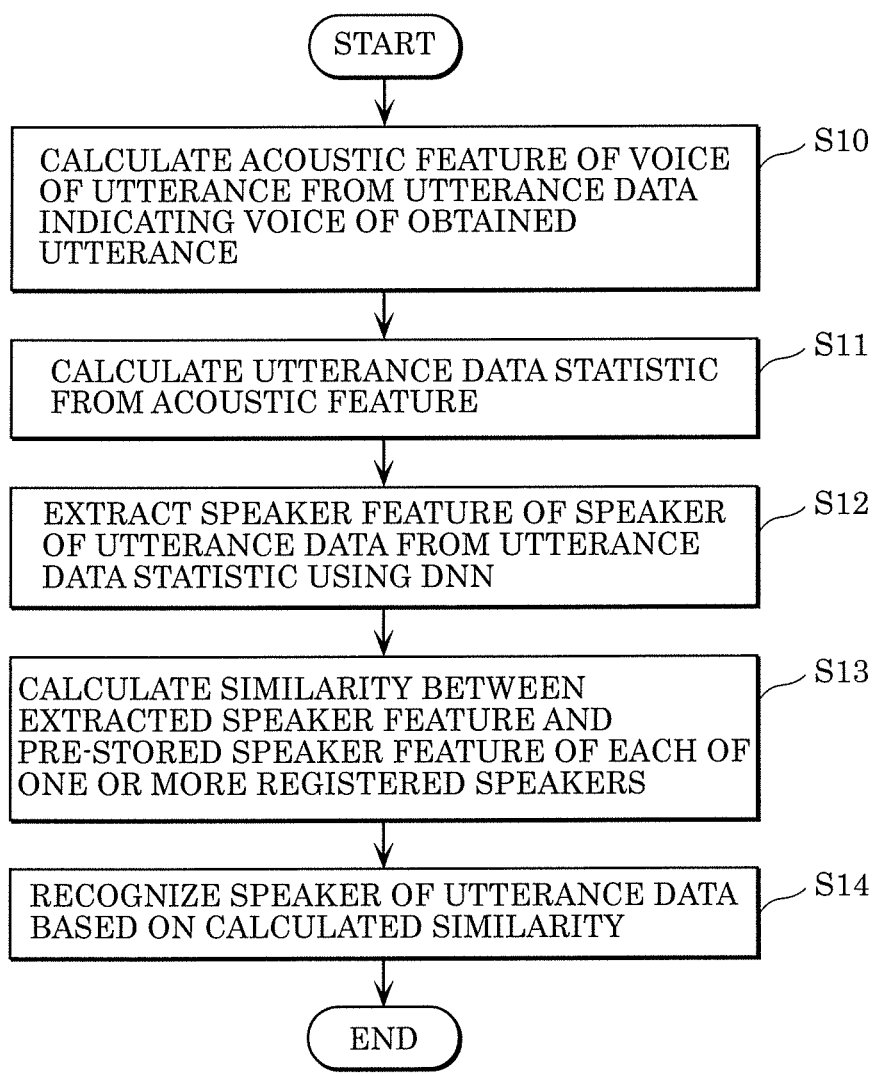
FIG. 7 is a flow chart illustrating an outline of the operation of the speaker recognition device according to the embodiment.

FIG. 7 is a flow chart illustrating an outline of the operation of speaker recognition device 11 according to this embodiment.

Firstly, speaker recognition device 11 calculates, from utterance data indicating a voice of an utterance obtained by voice obtainer 10, acoustic feature of the voice of the utterance (S10). Subsequently, speaker recognition device 11 calculates an utterance data statistic from the acoustic feature calculated at step S10 (S11). Subsequently, speaker recognition device 11 extracts, using a DNN, speaker feature of the speaker of the target utterance data from the utterance data statistic calculated at step S11 (S12). Subsequently, speaker recognition device 11 calculates a similarity between the speaker feature extracted at step S12 and pre-stored speaker feature of each of one or more registered speakers (S13). Subsequently, speaker recognition device 11 recognizes the speaker of the target utterance data based on the similarity calculated at step S13 (S14). At step S14, speaker recognition device 11 determines which one of the one or more registered speakers matches the speaker of the target utterance data.

[Advantageous Effects, Etc.]

As described above, in this embodiment, the acoustic feature of the voice of the target utterance of the speaker to be recognized is not directly used as an input of the DNN. More specifically, statistical processing for calculating characteristics over the entire utterance from the acoustic feature of the voice of the target utterance is newly introduced, and the statistic over the entire utterance calculated in the statistical processing is used as an input of the DNN to extract the speaker feature.

With this, the utterance data statistic corresponding to the acoustic feature including information on the entire utterance can be used to extract the speaker feature through the DNN, and thus it is possible to improve the accuracy of the speaker recognition even for a long utterance. Accordingly, speaker recognition device 11 capable of improving the accuracy of the speaker recognition using the DNN can be achieved.

Furthermore, in this embodiment, the components of the acoustic feature of the voice of the utterance data of the target utterance on which the speaker recognition is performed are classified into classes, and the mean may be calculated for each of the classes to obtain the statistic. More specifically, a GMM which is a speaker model for the utterance data of the target utterance is inferred from an UBM which is an initial model representing the average of the voices of the utterances of many unspecified speakers, and a difference between a super vector obtained by concatenating mean vectors of respective Gaussian distributions of the inferred GMM and a super vector obtained by concatenating mean vectors of respective Gaussian distributions of the UBM may be calculated as the statistic.

With this, it is possible to calculate the statistic that allows the extraction of the speaker feature considering the characteristics over the entire utterance, based on the difference between the acoustic feature of the utterances of general speakers and the acoustic feature of the utterance of a speaker to be recognized, and it is further possible to improve the accuracy of the speaker recognition even for a long utterance.

It should be noted that the statistic is not limited to the case where the utterance is modeled using the Gaussian mixture model (GMM) and the statistic is calculated based on the difference between the acoustic feature of general speakers and the acoustic feature of the utterance of a speaker to be recognized. The statistic may be calculated using the mean and variance as the statistical processing. The effectiveness of the statistic calculated using the mean and variance and the statistic calculated by modeling the utterance using the Gaussian mixture model will be described below with reference to the drawings.

Figure 8:
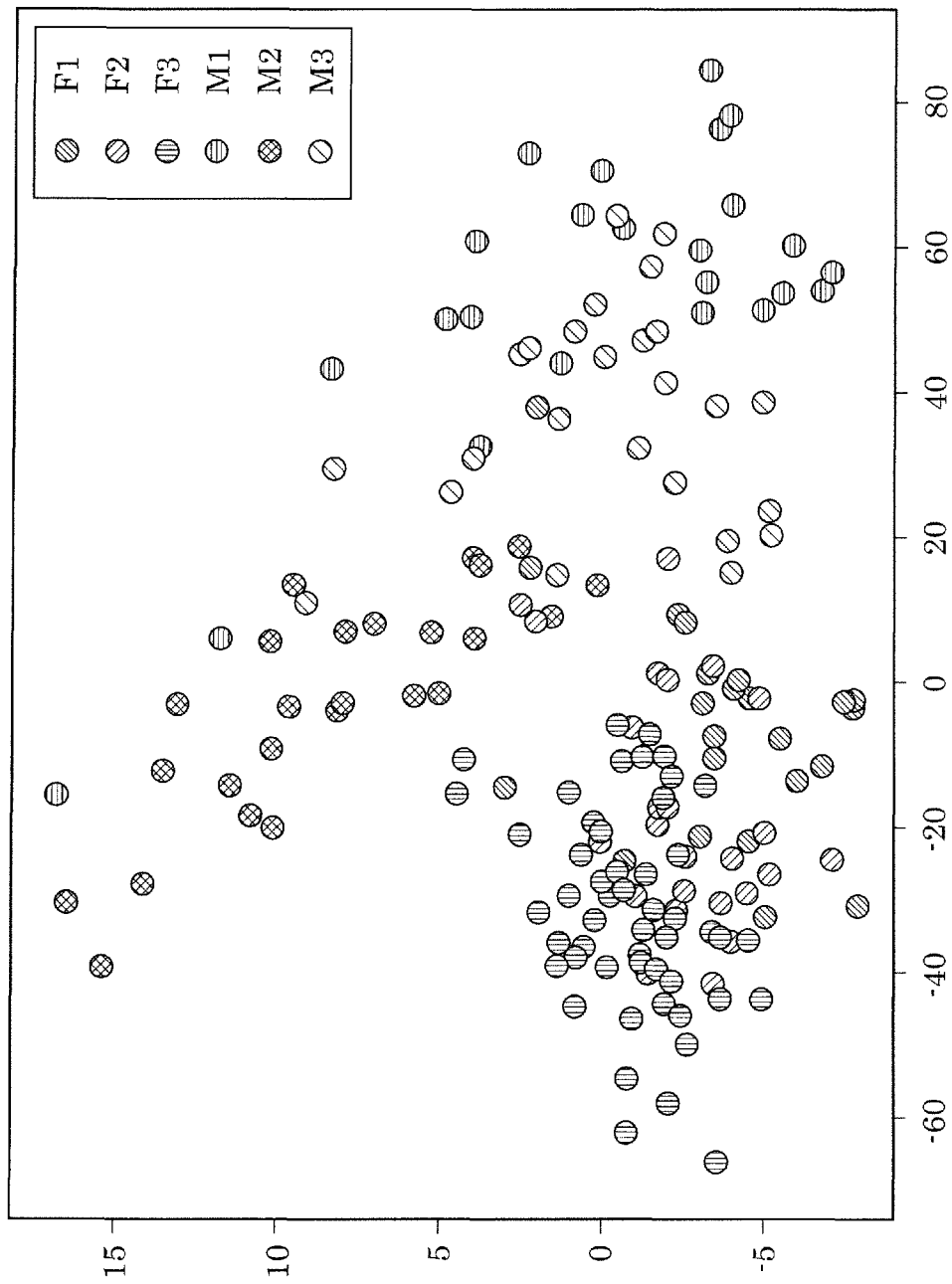
FIG. 8 is a diagram illustrating an example of a statistic calculated from MFCC calculated as acoustic feature for each utterance, using the temporal mean and variance.

FIG. 8 is a diagram illustrating an example of the statistic calculated from MFCC calculated as the acoustic feature for each utterance, using the temporal mean and variance. Each of the points shown in FIG. 8 is a 2-dimensional representation obtained by compressing, using principal component analysis (PCA), the temporal mean and variance of MFCC for a different one of the utterances made by three women denoted by F1 to F3 and three men denoted by M1 to M3.

Figure 9:
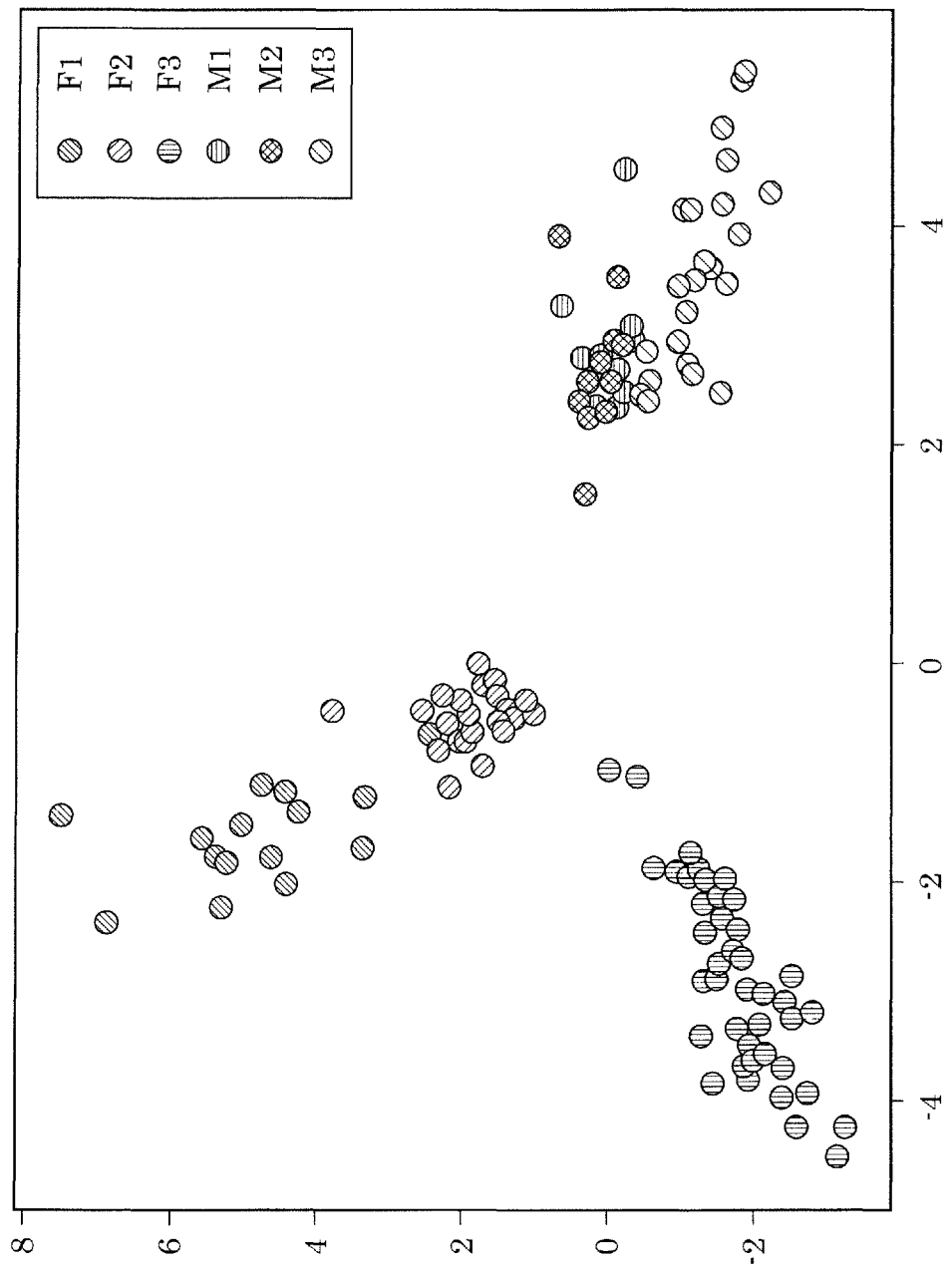
FIG. 9 is a diagram illustrating an example of a statistic calculated from MFCC calculated as acoustic feature for each utterance, by modeling the utterance using a Gaussian mixture model (GMM)

FIG. 9 is a diagram illustrating an example of the statistic calculated from MFCC calculated as the acoustic feature for each utterance, by modeling the utterance using the Gaussian mixture model (GMM) as described above. Each of the points shown in FIG. 9 is a 2-dimensional representation obtained by compressing, using the PCA, the statistic calculated from MFCC for a different one of the utterances made by three women denoted by F1 to F3 and three men denoted by M1 to M3 by modeling the utterance using the Gaussian mixture model (GMM).

FIGS. 8 and 9 each show the statistic simplified by transforming the multidimensional statistic to the 2-dimensional statistic, and thus the following focuses on only the tendency. As shown in FIG. 8, for the statistic calculated using the mean and variance, it is found that the utterance statistic distributions for different speakers are significantly overlapped with each other. On the other hand, as shown in FIG. 9, for the statistic calculated by modeling the utterance using the Gaussian mixture model (GMM), it is found that most of the utterance statistic distributions for different speakers are almost separated from each other even though some of the distributions are significantly overlapped.

It should be noted that the compressing the statistic to the 2-dimensional representation using the PCA corresponds to the linear transformation of the statistic. Accordingly, when the non-linear transformation such as the DNN is used instead of the linear transformation such as the PCA, higher speaker feature can be extracted from the statistic, and thus it is possible to more accurately recognize the speaker.

In further view of this, when the speaker feature is extracted using, as an input of the DNN, the statistic calculated using the mean and variance, it is inferred that even if the accuracy of the speaker recognition can be improved better than the case where the statistic is not used as the input, the improvement is small. On the other hand, when the speaker feature is extracted using, as an input of the DNN, the statistic calculated by modeling the utterance using the Gaussian mixture model (GMM), it is inferred that the accuracy of the speaker recognition can be improved better than both the cases where the statistic is not used as the input and where the statistic calculated using the mean and variance is used as the input.

Furthermore, in this embodiment, the DNN includes an input layer, multiple intermediate layers, and an output layer, and the speaker feature is extracted from any one of the intermediate layers of the DNN.

With this, the speaker feature can be extracted through the DNN without dependence on the speakers of the utterance data used to train the DNN, and thus it is possible to improve the accuracy of the speaker recognition using the DNN.

Here, the DNN is a bottleneck DNN, and a total number of nodes in one of the intermediate layers may be less than a total number of nodes in a remainder of the intermediate layers. With this, the dimension of the speaker feature extracted through the DNN can be reduced without losing information necessary for the speaker recognition, and thus the throughput can be reduced.

As described above, speaker recognition device 11 according to this embodiment can improve the accuracy of the speaker recognition using the DNN.

Example

The performance of the speaker recognition of speaker recognition device 11 has been evaluated using a discriminator using a cosine distance. This evaluation experiment and its results will be described as an example. It should be noted that as a comparison example, the speaker feature disclosed in NPL 1 has been evaluated using the discriminator using the cosine distance. It should be noted that hereinafter, the speaker feature disclosed in NPL 1, i.e. the speaker feature extracted using the bottleneck DNN that uses, as an input thereof, the acoustic feature of the voice of the utterance per short-time frame unit is referred to as d-vector. Furthermore, hereinafter, the speaker feature extracted by speaker recognition device 11 is referred to as s-vector. In other words, the s-vector is the speaker feature extracted using the bottleneck DNN that uses, as an input thereof, the statistic obtained by using the Gaussian mixture model to perform the statistical processing on the acoustic feature of the voice of the utterance.

<Evaluation Conditions>

FIG. 10 is a table illustrating an example of a training data set used in training according to this example. FIG. 11 is a table illustrating an example of an evaluation data set used in an evaluation experiment according to this example.

In this example, the UBM and the bottleneck DNN has been trained using data included in APP-BLA of the ATR voice database under the conditions shown in FIG. 10. It should be noted that in FIG. 10, the number of speakers for training equals to the number of outputs of the bottleneck DNN in the training, i.e. the number of nodes in the output layer. Furthermore, the utterance data included in APP-BLA of the ATR voice database is composed of voice data of the utterance per short-time frame unit. This voice data is used by being converted to the acoustic feature.

Furthermore, in this example, the evaluation experiment has been performed using the utterances included in the NTT-AT Japanese voice database shown in FIG. 11. The evaluation experiment has been performed using three sets of evaluation data for each of the registered speakers. In the evaluation experiment, for use in the actual environment, the voice of the target utterance has been evaluated using a clear voice without noise and a voice with noise recorded in a factory of 12 dB and 6 dB. It should be noted that all the voice data of the utterances included in the training data and the evaluation data has the sampling frequency of 16 kHz and the quantization bit rate of 16 bits.

For the s-vector, the acoustic feature is calculated using 20-dimensional MFCC, and the number of mixed Gaussian distributions of the UBM and GMM is set to 128. This is because an increase in the number of mixed Gaussian distributions of the UBM and GMM leads to an increase in the size of the bottleneck DNN, thereby making the training difficult.

Furthermore, the bottleneck DNN used for the s-vector is configured as follows. Specifically, the input is 128×20×3=7680-dimensional, the output is 3285-dimensional, the number of the intermediate layers (hidden layers) is 5, the 4-th intermediate layer is the bottleneck layer, and the output from the bottleneck layer is extracted as the speaker feature. The number of nodes in the bottleneck layer is 2048, and the number of nodes in the other layers is 4096. Rectified linear unit (ReLU) is used as the activation function in each layer.

On the other hand, for the d-vector, the number of speakers for training in this evaluation experiment is different from that of the experimental conditions described in NPL 1, and thus the bottleneck DNN differs in size between the d-vector and the s-vector.

In view of this, in order to conform to this evaluation experiment, the bottleneck DNN used for the d-vector is configured as described below to be a similar size to the bottleneck DNN used for the s-vector. Specifically, the 1600-dimensional vector obtained by concatenating 40 frames each consisting of 40-dimensional MFCC is used as an input of the bottleneck DNN. Furthermore, the output of the bottleneck DNN is 3285-dimensional, the number of the intermediate layers (hidden layers) is 5, the 4-th intermediate layer is the bottleneck layer, and the output from the bottleneck layer is extracted as the speaker feature. The number of nodes in the bottleneck layer is 2048, and the number of nodes in the other layers is 4096. Rectified linear unit (ReLU) is used as the activation function in each layer.

<Experimental Results>

FIG. 12 is a table illustrating experimental results of recognition performance evaluation using the evaluation data set according to this example. FIG. 12 shows that the s-vector has a higher recognition ratio (%) than the d-vector in both the clear voice environment and the noise environment. Accordingly, it is found that the s-vector has a high recognition performance. In other words, the effectiveness of using the statistic according to this embodiment is confirmed in the speaker recognition using the bottleneck DNN.

As described above, in the speaker recognition device and the speaker recognition method according to the present disclosure, an approach that extracts the statistic including the acoustic feature over the entire utterance is introduced instead of an approach that directly uses the acoustic feature for each time as an input of the DNN, and thereby it is possible to perform the speaker recognition using the characteristics over the entire utterance. Furthermore, as described in this example, the evaluation experiment shows that the introduced approach can achieve a higher accuracy of the speaker recognition than the approach in the comparison example that directly uses the acoustic feature for each time as an input of the DNN.

As described above, the speaker recognition device and the speaker recognition method according to the present disclosure can perform the speaker recognition using the characteristics over the entire utterance, and thus it is possible to improve the accuracy of the speaker recognition even for a long utterance. Accordingly, it is possible to improve the accuracy of the speaker recognition using the DNN.

(Variation)

In the above embodiment, the speaker is recognized from the similarity calculated using the speaker feature (s-vector) extracted through the DNN, but another method is possible. The speaker may be recognized from the similarity calculated using the speaker feature calculated by another method as well as the similarity calculated using the speaker feature extracted through the DNN.

It should be noted that NPL 1 discloses that a higher recognition performance than the speaker recognition using only the similarity based on the speaker feature extracted through the DNN can be achieved by simply taking the sum of the similarity based on the speaker feature extracted through the DNN and the similarity based on i-vector.

In view of this, in this variation, the case where the similarity is calculated using both s-vector and i-vector will be described. More specifically, in this variation, cosine distances of the s-vector and the i-vector are calculated, and the weighted sum of the cosine distances is used as the similarity. This process is performed since the s-vector and the i-vector significantly differ in dimension. This is because the weighted sum allows the calculation of the similarity considering the difference in dimension between the features of s-vector and i-vector even though the value of the cosine distance depends on the dimensionality.

<Evaluation Experiment and Results>

The performance of the speaker recognition using the combined similarity obtained by combining the similarity based on s-vector and the similarity based on i-vector according to this variation has been evaluated. This evaluation experiment and its results will be described below.

FIG. 13 is a table illustrating the experimental results of the recognition performance evaluation using the evaluation data set shown in FIG. 11. The d-vector and the s-vector shown in FIG. 13 are each the same as the speaker feature as described in the above example, and the evaluation experiment has been performed under the same evaluation conditions. Accordingly, the detailed description is omitted.

In this variation, the UBM used for i-vector has been trained using data included in APP-BLA of the ATR voice database under the conditions shown in FIG. 10, in the same manner as the s-vector. Furthermore, the evaluation experiment has been performed using the utterances included in the NTT-AT Japanese voice database shown in FIG. 11.

For the i-vector, the acoustic feature is also calculated using 20-dimensional MFCC, but the number of mixed Gaussian distributions of the UBM and GMM is set to 2048. This is because the performance of the i-vector is expected to be enhanced with an increase in the number of mixed Gaussian distributions.

FIG. 13 shows that the case where the combined similarity according to this variation is used has a higher recognition ratio (%) than the s-vector in both the clear voice environment and the noise environment. Accordingly, it is found that this case has a higher recognition performance.

The i-vector is obtained by linearly transforming the statistic, whereas the s-vector is obtained by non-linearly transforming the statistic. Accordingly, when the combined similarity according to this variation is used, it is inferred that the recognition performance is improved by complementing each other such that the non-linear transformation for s-vector can compensate the feature that cannot be extracted using only the linear transformation for i-vector.

Figure 14:
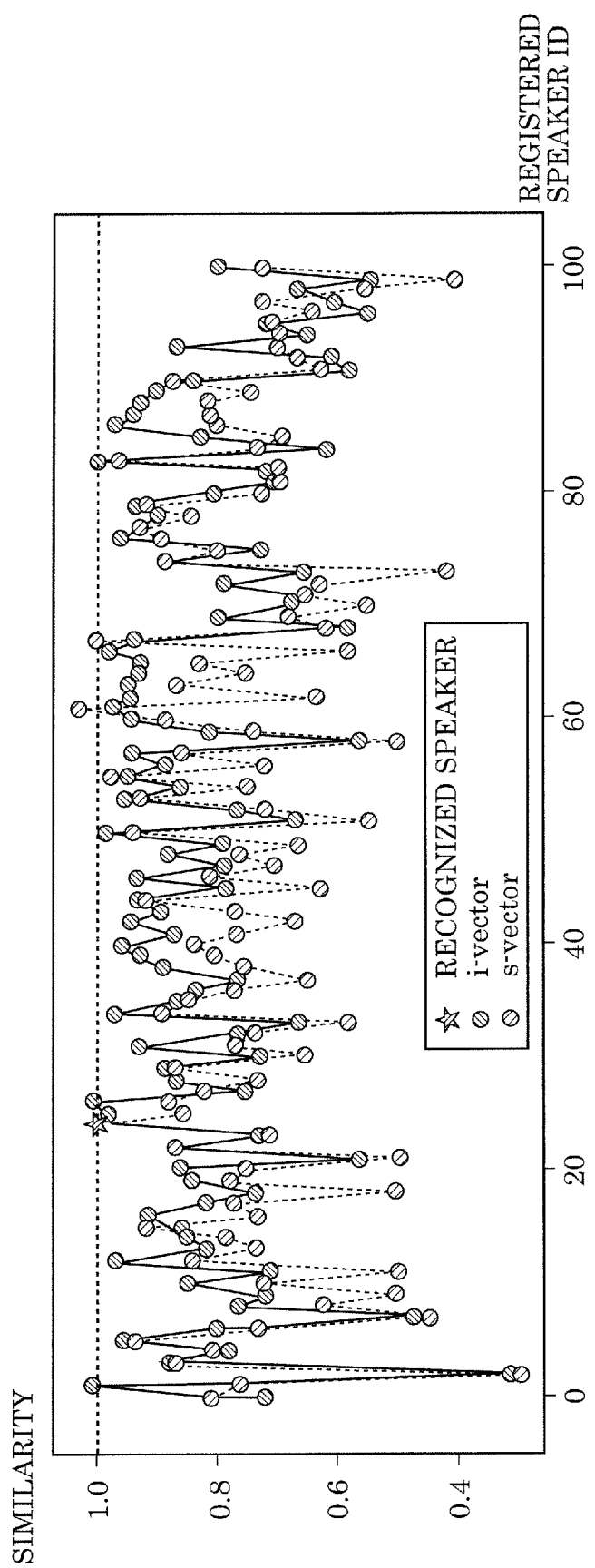
FIG. 14 is a diagram illustrating a similarity between a specific utterance and each registered speaker.

FIG. 14 is a diagram illustrating a similarity between a specific utterance and each registered speaker. The horizontal axis denotes the ID number of the registered speaker, and the vertical axis denotes the similarity. FIG. 14 plots the similarity based on i-vector between a specific utterance, i.e. a test utterance of a speaker, and each of the registered speakers, and the similarity based on s-vector between the test utterance of a speaker and each of the registered speakers. Furthermore, in FIG. 14, the similarity is normalized so that the similarity of the recognized speaker is set to 1.

As shown in FIG. 14, there is a speaker having the similarity higher than that of the recognized speaker in each of s-vector and i-vector for the test utterance. This means that misrecognition may occur when the speaker recognition is performed using a single approach, i.e. the similarity based on s-vector or the similarity based on i-vector.

On the other hand, there is no ID of the registered speaker having the similarity higher than 1 representing the recognized speaker in both the similarity based on s-vector and the similarity based on i-vector. Accordingly, it is found that the speaker recognition using the combined similarity can prevent the misrecognition.

In other words, the combined similarity according to this variation can be used to more accurately determine whether to match the registered speaker, and thus it is possible to further improve the accuracy of the speaker recognition using the DNN.

Other Possible Embodiments

The speaker recognition device according to an embodiment, a variation, and so forth according to the present disclosure have been described above, but the present disclosure is not limited to such embodiment and variation, etc.

For example, each of the processing units included in the speaker recognition device according to the foregoing embodiment, variation, etc. may be implemented as a large-scale integration (LSI), which is typically an integrated circuit. These processing units may take the form of individual chips, or one or more or all of the processing units may be encapsulated into a single chip.

Such integrated circuit is not limited to LSI. Each of the processing units thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

The present disclosure may also be implemented as a speaker recognition method performed by the speaker recognition device.

Furthermore, in the foregoing embodiment and variations, each of the structural components may be implemented as dedicated hardware or may be implemented by executing a software program suited to such structural components. Alternatively, the structural components may be implemented by a program executor such as a CPU and a processor reading out and executing the software program recorded in a recording medium such as a hard disk and a semiconductor memory.

Furthermore, the division of the functional blocks in the block diagrams is an example, and thus a plurality of functional blocks may be implemented as a single functional block, a single functional block may be divided into a plurality of blocks, or one or more functions may be moved to another functional block. Also, the functions of a plurality of functional blocks having similar functions may be processed by single hardware or software in parallel or in a time-shared manner.

The processing order of the steps in each flowchart is used to specifically describe the present disclosure, and thus such steps may be executed in a different order. Also, one or more of such steps may be simultaneously (parallelly) executed with another step.

The speaker recognition device according to one or more aspects of the present disclosure has been described on the basis of the embodiment, variation, etc., but the present disclosure is not limited to such embodiment, variation, etc.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a speaker recognition device, a speaker recognition method, and a recording medium. For example, the present disclosure is applicable to a speaker recognition device, a speaker recognition method, and a recording medium that automatically perform speaker recognition based on the voice of an utterance, such as an automatic meeting-note creating system capable of automatically creating notes of meetings.

What is claimed is:

1. A speaker recognition device, comprising:
an acoustic feature calculator that calculates, from utterance data indicating a voice of an entire utterance including a plurality of utterances obtained, acoustic feature of a voice of one of the plurality of utterances;
a statistic calculator that calculates an utterance data statistic from the acoustic feature, the utterance data statistic being a statistic that allows extraction of speaker feature considering characteristics of the entire utterance;
a speaker feature extractor that extracts the speaker feature of a speaker of the utterance data from the utterance data statistic using a deep neural network (DNN);
a similarity calculator that calculates a similarity between the speaker feature and pre-stored speaker feature of at least one registered speaker; and
a speaker recognizer that recognizes the speaker of the utterance data based on the similarity, wherein
the statistic calculator infers a Gaussian mixture model (GMM) from a universal background model (UBM),
the statistic calculator calculates the utterance data statistic as a difference between (i) a super vector obtained by concatenating mean vectors of respective Gaussian distributions of the GMM and (ii) a super vector obtained by concatenating mean vectors of respective Gaussian distributions of the UBM,
the GMM is a speaker model for the utterance data and formed by mixing the Gaussian distributions each corresponding to a different one of classes into which components of the acoustic feature of the voice of the utterance are classified, and
the UBM is an initial model and formed by mixing the Gaussian distributions each corresponding to a different one of classes into which components of acoustic feature of voices of utterances of many unspecified speakers are classified.

2. The speaker recognition device according to claim 1, wherein
the utterance data statistic is a statistic over the entire utterance that is obtained by performing statistical processing for extracting characteristics of the entire utterance from the acoustic feature, the entire utterance including the plurality of utterances.

3. The speaker recognition device according to claim 1, wherein
the DNN includes an input layer, a plurality of intermediate layers, and an output layer, and
the speaker feature extractor extracts the speaker feature from any one of the plurality of intermediate layers of the DNN.

4. The speaker recognition device according to claim 3, wherein
the DNN is a bottleneck DNN, and
a total number of nodes in one of the plurality of intermediate layers is less than a total number of nodes in a remainder of the plurality of intermediate layers.

5. A speaker recognition method executed by a computer, the speaker recognition method comprising:
calculating, from utterance data indicating a voice of an entire utterance including a plurality of utterances obtained, acoustic feature of a voice of one of the plurality of utterances;
calculating an utterance data statistic from the acoustic feature, the utterance data statistic being a statistic that allows extraction of speaker feature considering characteristics of the entire utterance;
extracting the speaker feature of a speaker of the utterance data from the utterance data statistic using a deep neural network (DNN);
calculating a similarity between the speaker feature and pre-stored speaker feature of at least one registered speaker; and
recognizing the speaker of the utterance data based on the similarity, wherein
the calculating the utterance data statistic includes inferring a Gaussian mixture model (GMM) from a universal background model (UBM),
the calculating the utterance data statistic includes calculating the utterance data statistic as a difference between (i) a super vector obtained by concatenating mean vectors of respective Gaussian distributions of the GMM and (ii) a super vector obtained by concatenating mean vectors of respective Gaussian distributions of the UBM,
the GMM is a speaker model for the utterance data and formed by mixing the Gaussian distributions each corresponding to a different one of classes into which components of the acoustic feature of the voice of the utterance are classified, and
the UBM is an initial model and formed by mixing the Gaussian distributions each corresponding to a different one of classes into which components of acoustic feature of voices of utterances of many unspecified speakers are classified.

6. A non-transitory computer-readable recording medium on which a computer program is recorded, the computer program causing a computer to execute:

calculating, from utterance data indicating a voice of an entire utterance including a plurality of utterances obtained, acoustic feature of a voice of one of the plurality of utterances;

calculating an utterance data statistic from the acoustic feature, the utterance data statistic being a statistic that allows extraction of speaker feature considering characteristics of the entire utterance;

extracting the speaker feature of a speaker of the utterance data from the utterance data statistic using a deep neural network (DNN);

calculating a similarity between the speaker feature and pre-stored speaker feature of at least one registered speaker; and recognizing the speaker of the utterance data based on the similarity, wherein the calculating the utterance data statistic includes inferring a Gaussian mixture model (GMM) from a universal background model (UBM), the calculating the utterance data statistic includes calculating the utterance data statistic as a difference between (i) a super vector obtained by concatenating mean vectors of respective Gaussian distributions of the GMM and (ii) a super vector obtained by concatenating mean vectors of respective Gaussian distributions of the UBM, the GMM is a speaker model for the utterance data and formed by mixing the Gaussian distributions each corresponding to a different one of classes into which components of the acoustic feature of the voice of the utterance are classified, and the UBM is an initial model and formed by mixing the Gaussian distributions each corresponding to a different one of classes into which components of acoustic feature of voices of utterances of many unspecified speakers are classified.

* * * * *